July 26, 1966     W. GILLESPIE, JR     3,262,655
ALLEVIATION OF DIVERGENCE DURING ROCKET LAUNCH
Filed Dec. 26, 1963     4 Sheets-Sheet 1
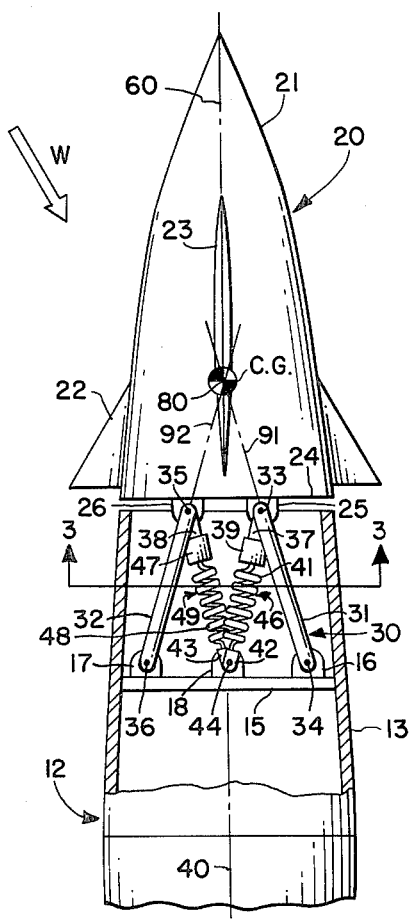
INVENTOR
WARREN GILLESPIE, JR.
BY
ATTORNEYS July 26, 1966 W. GILLESPIE, JR 3,262,655
ALLEVIATION OF DIVERGENCE DURING ROCKET LAUNCH
Filed Dec. 26, 1963 4 Sheets-Sheet 2

INVENTOR
WARREN GILLESPIE, JR.

BY
ATTORNEYS

July 26, 1966  W. GILLESPIE, JR  3,262,655
ALLEVIATION OF DIVERGENCE DURING ROCKET LAUNCH
Filed Dec. 26, 1963  4 Sheets-Sheet 3

INVENTOR
WARREN GILLESPIE, JR.

BY
ATTORNEYS

United States Patent Office 3,262,655
Patented July 26, 1966

3,262,655
ALLEVIATION OF DIVERGENCE DURING
ROCKET LAUNCH
Warren Gillespie, Jr., Houston, Tex., assignor to the United States of America as represented by the Administrator of the National Aeronautics and Space Administration
Filed Dec. 26, 1963, Ser. No. 333,766
14 Claims. (Cl. 244—1)

The invention described herein may be manufactured and used by or for the Government of the United States of America for governmental purposes without the payment of any royalties thereon or therefor.

This invention relates generally to means for connecting two sections of a vehicle and more particularly to a linkage pivoted at the upper end of a booster and to the after portion of a payload.

Generally, a payload vehicle is rigidly secured to a large booster vehicle in order to establish stability and prevent the problem of flutter. It is not always possible to anticipate the sizes and configurations of payloads for which a specific launching vehicle has proven performance and, consequently, it is necessary to over-design the rigid connection which necessarily adds considerable weight to the overall vehicle. A rigid structural connection provides a satisfactory means for overcoming the moments applied to the rocket due to aerodynamic forces, but does not relieve the strain exerted on the booster by such forces. This structural approach to the servo-aeroelastic divergence problem appears to be inadequate, even though the rigid connection may be designed during the early stages of the vehicle development.

Accordingly, it is an object of the present invention to provide means for rocket boost of payloads having large lifting surfaces and/or lift capability.

Another object of this invention is to provide means for reducing the bending moment which is applied to a payload-booster combination as the result of aerodynamic forces.

A further object of the invention is to rotate the payload with respect to the vehicle centerline so as to reduce the angle of attack of the payload and the corresponding aerodynamic force on the payload and prevent aeroelastic divergence or structural failure during boost.

Still another object of the invention is to provide a connection between two sections of an aerodynamic body which permits angular displacement of one section and still permits retention of stability during acceleration of the body.

Yet another object of this invention is to provide damping means for effecting stability and preventing flutter of a payload when connected to a booster in a "free-floating" manner.

A further object of the invention is to provide means for reducing the structural size and weight of the booster fins, of the connection between a payload and booster and of the structure of the booster in order to permit larger and heavier payloads.

Another object of the instant invention is to provide a linkage that permits one section of an aerodynamic body to be essentially free-floating and to trim into the relative wind of its own accord so as to reduce stabilizing control moments required of gimballed rocket motors or booster fins.

Another object of the invention is to provide a connection between sections of an aerodynamic body which utilizes links having their extended longitudinal axes passing through the center of gravity of the forward section.

Generally speaking, the foregoing and other objects are accomplished in accordance with this invention by connecting a payload to the last rocket booster stage by a four-bar linkage system. The space between the payload and the booster which is normally used to provide an adapter structure for rigidly joining the payload and booster is used to provide space for at least two links which are pivoted at one end to the booster and at the other end to the payload. These links are arranged so their extended centerlines cross the central longitudinal axis of the combined vehicle at the center of gravity of the payload. Depending upon the arrangement of the linkage, it may be necessary to provide a stabilizer, such as springs and damping means, for stability of the payload during positive axial thrust acceleration. Thus, the linkage permits the payload to be essentially "free-floating" and to trim into the relative wind so as to reduce the stabilizing control moment required of the gimballed rocket motor or motors.

A more complete appreciation of the invention and many of the attendant advantages thereof will be readily apparent as the same becomes better understood by reference to the following detailed description when considered in connection with the accompanying drawings wherein:

FIG. 1 is a schematic showing a bending moment caused by relative wind acting upon an aerodynamic body;

FIGURE 2 is a segmental, side elevational view partially cut away to show the invention;

FIGURE 3 is a cross-sectional view taken on line 3—3 of FIGURE 2;

FIGURE 10 is a cross-section view similar to FIGURE 3 showing an alternative arrangement of the linkage.

Figure 4:
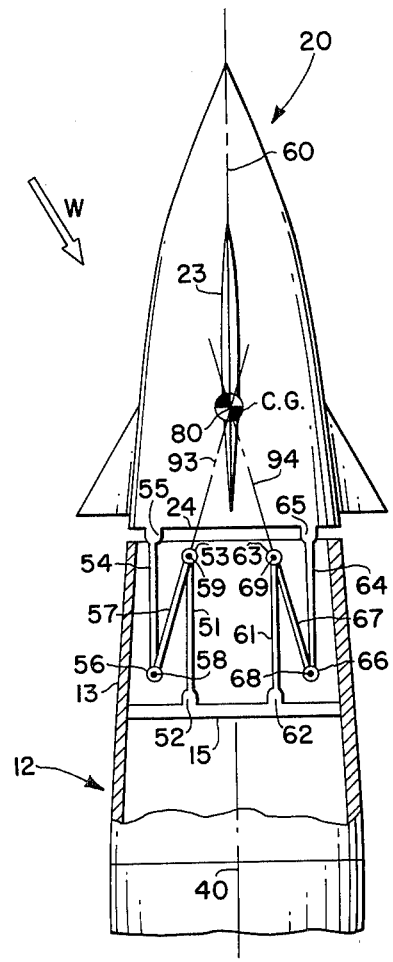
FIGURE 4 is a segmental, side elevational view partially cut away to show another embodiment of the invention.

Referring now to the drawings wherein like reference numerals designate identical or corresponding parts throughout the several views, and more particularly to FIGURE 1 wherein the aerodynamic body or rocket craft, generally designated by reference numeral 10, is shown as having one section, such as booster 12, to which is connected another section, such as payload 20. Circular arrow BM indicates the bending moment caused by aerodynamic forces normally resulting from a relative wind shown by arrow W.

One embodiment of the instant invention is shown in FIGURE 2, wherein booster 12 has a recess comprised of sidewall or frame member 13 and bottom 15, which serves as a closure element for separating the connection means and the rocket structure contained within booster 12. As will be described more fully hereinafter, closure element 15 has securing elements or pivot connections 16 and 17 secured thereto adjacent recess sidewall 13. It is to be noted that, although shown as pivot connections, securing elements 16 and 17 may be of any construction that permits rotational movement. For example, they may be universal joints if desired. FIGURES 3 and 10 show alternative arrangements which indicate that these pivot connections may be peripherally or circumferentially spaced symmetrically about closure member 15 and are of an even number in order that any two may accommodate the ends of a pair of links. Another pivot connection 18 is shown to be centrally located on closure member 15 for connection of stabilizing means to be described below.

Generally payload 20 is of a substantially conical or projectile configuration with conventional superstructure and has shell or body 21 which is curved to form the apex of the right cone. Fins 22 are substantially triangular members which extend outwardly from the surface of the payload adjacent base 24 thereof. Wings 23 are shown as extending in the same plane as lateral axis 80 of payload 20. After portion or base 24 is provided with pivot connections 25 and 26 which are spaced inwardly from the surface of the cone a distance as will be more clearly set forth hereinafter.

The embodiment of the instant invention shown in FIGURE 2, has linkage 30 with a pair of links 31 and 32 extending between and pivoted on pivot axes 33, 34, 35, and 36 of pivot connections 25 and 16 and 26 and 17, respectively. These axes are shown as extending substantially parallel to lateral axis 80 of payload 20. Rod 37 may be pivotally attached to link 31 or axis 33 at one end and the other end is secured to damper means 39. Damper means 39 may be of any well known type; however, dashpot dampers are considered to function well in this system. Spring 41 is attached at one end to damping means 39 and at the other end to rod 42 to form spring link or stabilizer means 46. Rod 38 is similar to rod 37, but is pivotally attached to link 32 or axis 35 at one end and secured at the other end to a second damper means 47 which is similar to the damper means 39. One end of spring 48 is attached to damper means 47 and the other end is secured to rod 43 to form a second spring link or stabilizer means 39.

Thus it is seeen that rod 37, damper means 39, spring 41 and rod 42 form link 46, which may be considered a spring link or stabilizing means, and rod 38, damper means 41, spring 48 and rod 43 form a second stabilizing means or link 49. Each of the stabilizer means is pivoted on pivot axis 44 of connection 18 which is secured to closure element or recess bottom 15. As indicated above, pivot connection 18 is generally located midway between recess sidewall or frame member 13. Pivot axis 44, for pivot connection 18 and rods 42 and 43, is shown as extending parallel to pivot axes 33, 34, 35, and 36 which in turn are shown as being substantially parallel to lateral axis 80 of payload 20. For descriptive purposes, lateral axis 80 may also be considered the longitudinal axis of wings 23.

Figure 7:
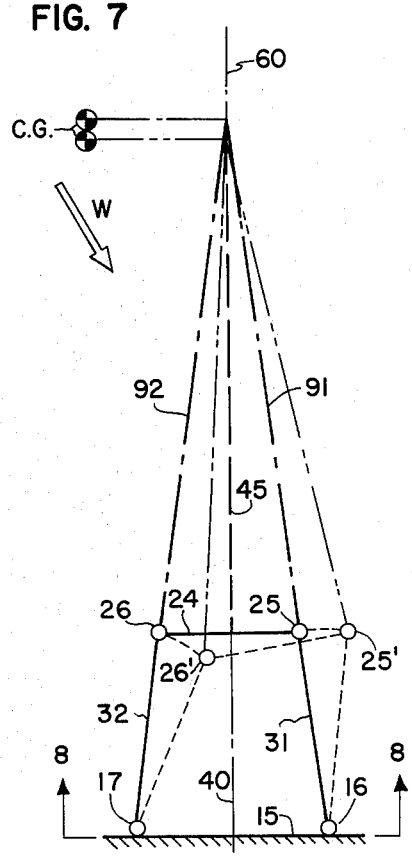
FIGURE 7 is a line diagram showing the central axes of the links and their extensions in an unstable condition for both a static and a dynamic position.

Center of gravity (C.G.) of payload 20 is located upon payload longitudinal axis 60 which coincides with and is an extension of longitudinal axis 40 of booster 12 of aerodynamic body 10. That is, booster longitudinal axis 40 and payload longitudinal axis 60 are mutual extensions of one another and may be considered the centerline of aerodynamic body 10. Link 31 is shown as having extended central longitudinal axis 91 and link 32 as having extended central longitudinal axis 92. As shown in FIGURES 2, 3, and 7, these extended central longitudinal axes of links 31 and 32 cross at center of gravity C.G. of payload 20.

Closure element 15, link 31, base 24 and link 32 form a four-bar linkage system which pivots at each end of links 31 and 32. Upon acceleration of aerodynamic body 10 the four-bar linkage would have a tendency to collapse and the trim into relative wind W would be of no effect. However, by utilizing the spring links or some other well known stabilizer, a means is provided for opposition to the collapsing tendency and establishes the essentially "free-floating" characteristic of the connection as well as acting in conjunction with damper means 39 and 47 for restraining flutter. This free-floating characteristic permits payload 20 to trim into relative wind W, thereby reducing the angle of attack with the attendant reduction of bending moments which would be applied to booster 12 by a rigid connection between it and payload 20. Consequently, a reduction in the size and weight of the connection is possible with the advantage of having a greater carrying capacity for payload 20 which trims into relative wind W, but remains stable due to the provision of the stabilizing means.

Figure 8:
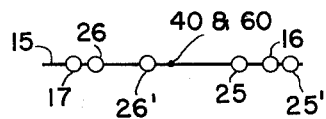
FIGURE 8 is a cross-sectional view taken on line 8—8 of FIGURE 7.

As more clearly shown in FIGURES 7 and 8, as payload 20 trims into relative wind W, links 31 and 32, as well as base 24 and pivot connections 25 and 26, rotate from the normal position, as shown in solid lines, to the trimmed position, as shown by the dash lines at the upper portion of FIGURE 7. Thus pivot connections 25 and 26 become displaced to the alternative position designated 25' and 26'. The section of base 24 of payload 20 between pivot connections 25 and 26 forms one of the links of the four-bar linkage comprised of closure member 15, links 31 and 32 and the hereinbefore indicated portion of payload 20. Dashed line 45, see FIGURE 7, is a perpendicular bisector of the section of base 24 forming the link. As is readily apparent from FIGURES 7 and 8, when payload 20 is angularly displaced links 31 and 32 rotate in such a manner that link 31 increases the distance of base 24 and pivot connection 25 of payload 20 from closure element 15. Similarly link 32 rotates so as to reduce the distance of base 24 and pivot connection 26 from closure element 15.

Since each of the links in the four-bar linkage is of a fixed length the linkage has a configuration as shown by the solid and short dashed lines in FIGURE 7. Perpendicular bisector 45 of the link made up of base 24 between pivot connections 25 and 26 also is angularly displaced in substantially the same direction as the longitudinal centerline 60 of payload 20 and consequently crosses centerline 60 between the original location of center of gravity (C.G.) and base 24 of payload 20. This relative rearward movement of center of gravity (C.G.) along centerline 60 would create an unstable condition for payload 20 during positive axial thrust acceleration. However, stabilizing means 46 and 49 overcome such adverse effects and establish a stable condition and prevent flutter of payload 20.

Another embodiment of the instant invention is shown in FIGURE 4 wherein the pivot connections are reversed to provide a linkage that imparts stability to payload 20 and assists in avoiding flutter. In order to accomplish the advantages of the instant invention, this embodiment is shown to have rigid elongated bars 51 and 61 secured at one end to closure element 15 of booster 12. That is, bar 51 is rigidly secured to closure member 15 at 52 and bar 61 is rigidly secured at 62 to closure element 15. The other end of each of bars 51 and 61 is provided with pivot connections 53 and 63, respectively. Payload 20 has bars or struts 54 and 64 rigidly secured thereto on base 24 at peripherally spaced points 55 and 65, respectively. The other ends of bars or struts 54 and 64 are respectively provided with pivot connections 56 and 66.

Extending between pivot connections 53 and 56 is link 57 and between pivot connections 63 and 66 is link 67. Each end of links 57 and 67 is provided with a pivot connection. Accordingly, link 57 is pivotally attached to pivot axes 58 and 59 on bars or rods 54 and 51, respectively, and link 67 is pivotally attached to pivot axes 68 and 69 on bars 64 and 61, respectively. As shown in FIGURE 4, bars or rods 51 and 54 and link 57 are attached to one another such as to form a Z-shaped linkage and bars 61 and 64 with link 67 form another Z-shaped linkage. Thus a pair of Z-shaped linkages are provided for effecting the connection of payload 20 to booster 12.

Each of the pivot connections is shown as pivoting about an axis which is shown to be parallel to lateral axis 80 of payload 20. Therefore, not only are the pivot connection axes mutually parallel, but they are also substantially parallel to the longitudinal axis of wings 23 and lateral axis 80. Link 57 is shown in FIGURE 4 to have extended central longitudinal axis 93 crossing longitudinal axis 60 of payload 20 at center of gravity (C.G.) and link 67 as having extended central longitudinal axis 94 which also crosses longitudinal axis 60 at center of gravity (C.G.) of payload 20. These pivotal connections permit the four-bar linkage to be angularly displaced in two directions without restraint; thereby establishing the free-floating characteristic of payload 20. Accordingly, as the aerodynamic forces act to reduce the angle of attack of payload 20 and it trims into relative wind W, the angular displacement of bars 54 and 64 and the attendant angular displacement of links 57 and 67 result in a reduction of movement BM and provide stability to payload 20 due to center of gravity (C.G.) moving forward along centerline 60 as opposed to the embodiment of FIGURE 2 which requires stabilizing means.

Figure 5:
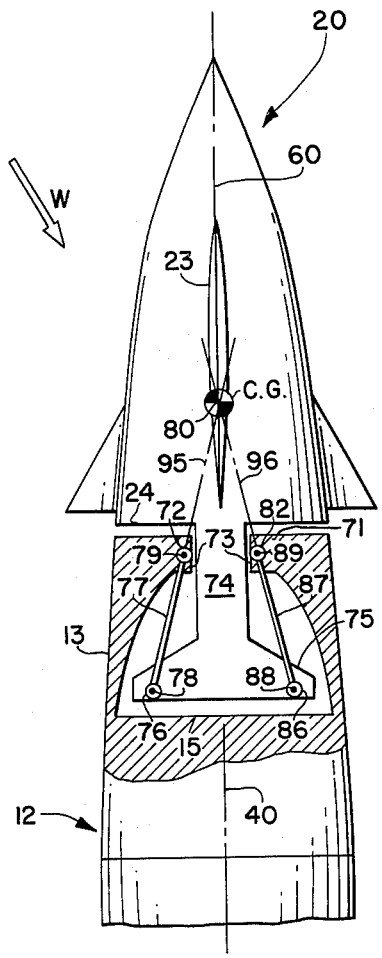
FIGURE 5 is a segmental, side elevational view partially cut away to show a further embodiment of the invention.

Another embodiment of the present invention is shown in FIGURE 5 wherein the points of pivot are reversed to provide a connection or construction similar to that described in reference to FIGURE 4. This embodiment has a projection or flange 71 which extends inwardly from the frame member or sidewall 13 of the upper portion of the recess in booster 12. Projection 71 is at the upper edge of the recess adjacent base 24 of payload 20 and may be of singular or multiple piece construction in order to effect connection of payload 20 and booster 12. Interfaces 73 of flange 71 are spaced to provide an opening or aperture for reception of a portion of payload 20 to be described more fully hereinafter. Pivot connections 72 and 82 are located adjacent interface 73 and the inward side of flange 71 nearest closure member 15. These pivot connections have pivot axes 79 and 89, respectively.

Payload 20 has a projection or T-shaped extension 74 extending from base 24. The width of the leg of extension 74 is less than that of the opening formed by flange 71 by a distance sufficient to permit rotation of payload 20 with respect to longitudinal axis 40 of booster 12. Crossbar 75 of T-shaped extension 74 is provided with pivot connections 76 and 86 adjacent the outer edges thereof and which have axes 78 and 88, respectively. Connection of payload 20 to booster 12 is effected by links 77 and 87 which have a pivot connection at each end thereof. That is, link 77 is attached to pivot axis 79 on flange 71 and pivot axis 78 on crossbar 75 while link 87 is attached to flange 71 on pivot axis 89 and to crossbar 75 on pivot axis 88. If it is so desired extension 74 may be of multiple piece construction in order to facilitate the connection of payload 20 and booster 12.

Longitudinal axes 95 and 96 of links 77 and 87, respectively, when extended, cross one another and central longitudinal axis 60 of payload 20 at center of gravity (C.G.) of payload 20. In order to permit links 77 and 87 to be oriented so their extended longitudinal axes cross at center of gravity (C.G.), it is obvious that crossbar 75 must be of greater cross-sectional dimension than the opening formed by flange 71. As indicated for the other embodiments of the instant invention, the pivot axes of the pivot connections for links 77 and 87 are shown as being mutually parallel and also substantially parallel to lateral axis 80 of payload 20. Thus it is seen that the present embodiment of this invention operates similarly to the embodiment described with reference to FIGURE 4. As described hereinabove, securing payload 20 in place may be accomplished by forming extension 74 in two sections or attaching a multiple piece flange 71 to frame member 13 of booster 12 after payload 20 has been placed in position.

Each of the above embodiments of the invention was described as having pivotal connections of the links extending between the structure of one section and that of an adjacent section. It is to be understood that such description is merely for the purpose of clarity and that many similar types of well known connections may be utilized so long as they permit freedom for angular displacement. Accordingly, connections such, for example, as the conventional ball and socket or universal joint may be used without departing from the concept of the instant invention. The latter type of connections would permit three dimensional movement which may be desirable under certain circumstances where the direction of relative wind W is unknown prior to launch or at a time of acceleration.

Figure 6:
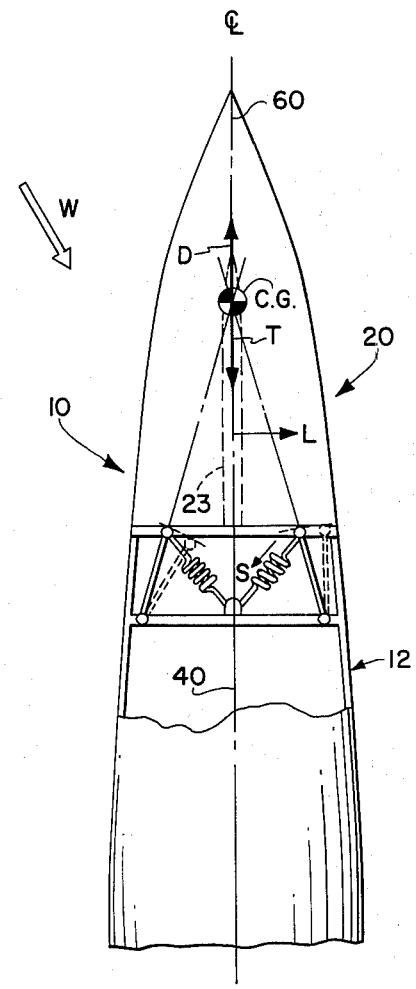
FIGURE 6 is a force diagram showing the forces acting upon one section of an aerodynamic body.

FIGURE 6 is a diagrammatic view of the various forces which act upon the booster and payload to produce bending moment BM, as shown in FIGURE 1. Essentially there are three forces which act to cause bending moment BM to be applied to the booster. There is force T caused by the positive axial thrust acceleration produced by the rocket engine in booster 12 and there is drag force D which acts oppositely to force T and is the result of friction on the outer surfaces of booster 12 and payload 20. Each of the forces T and D acts along the centerline of aerodynamic body 10.

Because relative wind W strikes the vehicle at an angle, wings 23 create a lift force L which is shown to be perpendicular to longitudinal axis 60 of payload 20. However, lift force L will normally have a direction which is some function of the angle between the direction of relative wind W and longitudinal axis 60. That is the angle which lift force L makes to longtudinal axis 60 is generally determined by the direction of relative wind W. Since payload 20 rotates substantially about its center of gravity (C.G.), it is apparent that forces T and D will oppose one another while lift force L causes the angular dispalcement of payload 20 so as to reduce the angle of attack and trim payload 20 into relative wind W.

In the absence of some restraining means, a slight angular displacement of payload 20 would result in links 31 and 32, as seen in FIGURE 2, to be displaced. Thus, when the power means of booster 12 are in operation, thrust force T would be extremely large and tend to collapse the four-bar linkage connection and prevent trimming. In order to prevent this collapse, springs 41 and 48 are attached to links 31 and 32 in a manner to oppose the collapsing effect of thrust force T as described hereinabove. As is also apparent from FIGURE 6, any variation of surrounding conditions would cause a trimming action and the attendant change in angle of attack. Springs 41 and 48 also act to oppose such variations in trimming action.

Springs 41 and 48, however, necessarily have an inherent characteristic of vibrating. The variation in environmental conditions and the characteristics of springs 41 and 48 are opposed or compensated for by the provision of stabilizing means such as damping means 39 and 47. In taking moments, it is obvious that spring force S and any force created by the stabilizing means must be taken into account. Thus, in determining bending moment BM by taking moments at the point of connection of the linkage to booster 12, consideration must be given to not only thrust force T, drag force D, and lift force L, but also the forces created by springs 41 and 48 and the stabilizing means or dampers 39 and 47 for the embodiment of FIGURE 2.

In order to avoid collapse of the linkage for the embodiments of FIGURES 4 and 5, the pivot connections are reversed. Such a reverse of the pivot connections causes thrust force T to be resolved into forces which would act along or parallel to the extended longitudinal axes of the links and in essence create a pulling, rather than a pushing, effect which tends to prevent collapse of the linkage. Since it is well known that forces are not transmitted through pivot connections so as to establish a bending moment, it is apparent that the bending moment created by relative wind W acting on payload 20 which would be applied to booster 12 is negligible. Accordingly, the links of the embodiments shown in FIGURES 3 and 5 must only have a strength sufficient to overcome the tensile force produced by thrust force T.

Figure 9:
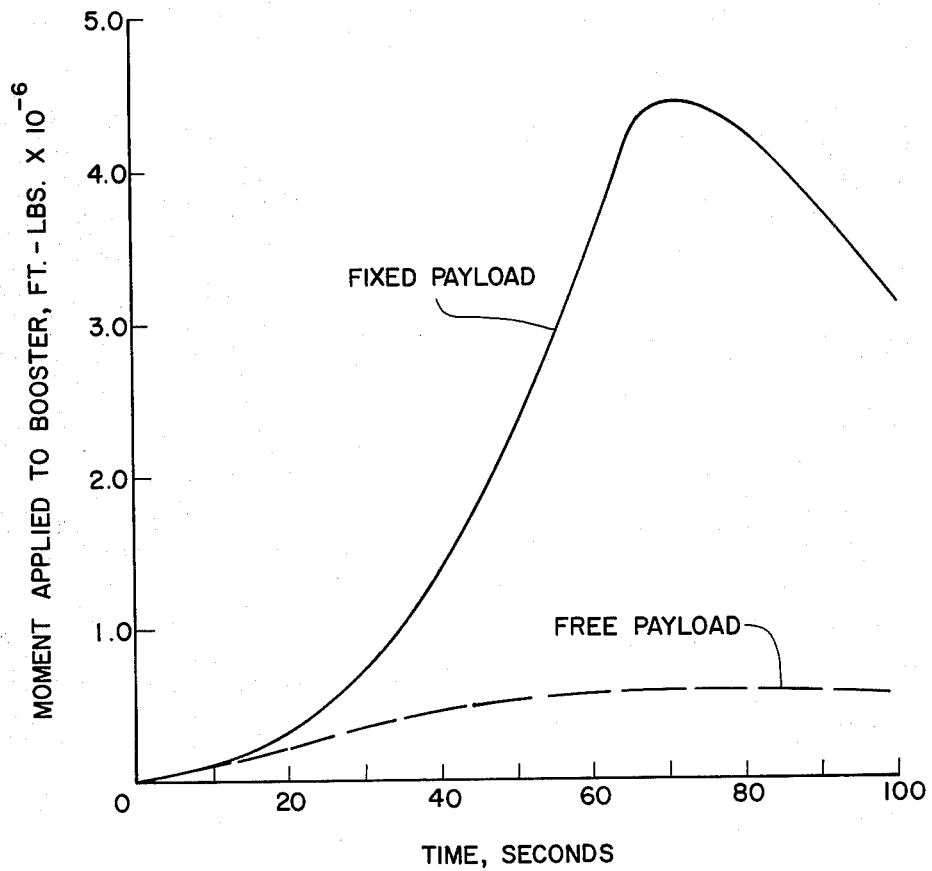
FIGURE 9 is a graph showing the moment curves of the structure of the instant invention as compared to the moments of a fixed payload.

The graph of FIGURE 9 shows the effect the instant invention has because the free-floating payload reduces the angle of attack and, consequently, the bending moment applied to the booster during a normal launch period. The change in bending moment is plotted against the change in time for a fixed, solid line, and for a free-floating payload. A comparison of the moments, at approximately launch plus seventy seconds, shows there is a considerably smaller maximum moment for the free-floating payload of the instant invention. Since structural requirements are directly related to the amount of bending moment, it necessarily follows that the free-floating payload permits the use of a much smaller connection with the attendant saving of size and weight which permits greater capacity for the payload.

It is apparent that there are many modifications of the linkage which would permit payload 20 to retain its free-floating characteristic. One alternative arrangement is shown in FIGURE 10 wherein links 31 and 32 are located so as to form a plurality of pairs. Such an arrangement provides a stronger connection between payload 20 and booster 12 and permits substantially the same ease of trimming into relative wind W. Although the connection is shown in FIGURE 10 as having two pairs of links, it is to be understood that any number of pairs of links may be used within the scope of the invention. Should it be desirable to utilize a connection capable of angular displacement in any direction, it is necessary to merely substitute a universal joint for the pivot connections securing the links to the two sections of the aerodynamic body.

Obviously many modifications and variations of the subject invention are possible in the light of the above teachings. It is, therefore, to be understood that within the scope of the appended claims the invention may be practiced otherwise than as specifically described.

What is claimed as new and desired to be secured by Letters Patent of the United States is:

1. A combination for an aerodynamic body having at least two sections comprised of:
   linkage means connecting at least two sections; and
   the extended longitudinal centerlines of the links crossing at the center of gravity of one section,
   whereby the moment caused by transverse aerodynamic forces that is applied to one section is reduced.

2. A connection for a booster and payload of a space vehicle comprised of:
   link means pivotally secured to a payload and a booster;
   the extended longitudinal centerlines of said links crossing at the center of gravity of said payloads; and
   stabilizing means attached to said link means and to said booster, whereby the moment caused by transverse aerodynamic forces that is applied to said booster is reduced.

3. A connection for a booster and payload of a space vehicle as defined in claim 2 comprised of:
   said stabilizing means including damping means.

4. A connection for a booster and payload of a space vehicle as defined in claim 2 comprised of:
   said stabilizing means including spring means for preventing collapse of said links.

5. A connection for a booster and payload of a space vehicle as defined in claim 2 comprised of:
   said stabilizing means including spring means and damping means.

6. In an aerodynamic body, the combination comprised of:
   a booster;
   a payload;
   linkage means for attaching said payload to said booster;
   said linkage means having at least one pair of links pivotally attached at one end to said booster and at the other end to said payload;
   the extended longitudinal centerlines of said links in a pair crossing at the center of gravity of said payload;
   whereby the payload is free-floating, moments caused by aerodynamic forces are reduced and a stable condition exists during positive axial thrust acceleration.

7. A connection for adjacent sections of an aerodynamic body, comprised of:
   a first section;
   a second section adjacent said first section;
   at least two linkages connecting said first and second sections;
   at least one strut of each linkage being fixed to one of said sections;
   at least one link of each linkage being pivotal; and
   the extended longitudinal axes of said pivotal links passing through the center of gravity of one of said sections.

8. A connection for alleviation of divergence during rocket launch of a payload, comprised of:
   a booster having launch means;
   said booster having a recess with a bottom in one end thereof;
   bars secured to said recess bottom;
   links having one end pivotally attached to said bars;
   the other end of said links pivotally attached to one end of other bars;
   the opposite end of said other bars secured to a payload; and
   the extended longitudinal centerline of said links cross the central longitudinal axis of said booster and payload at the center of gravity of said payload.

9. A vehicle comprised of:
   a booster having a recess in one end thereof;
   said recess having a bottom, side, and a flange extending inwardly from said side;
   a plurality of links having one end pivotally attached to the inner portion of said flange;
   a payload having a body and a base;
   said base having an extension;
   the other end of said links pivotally attached to said extension; and
   the extended centerlines of said links cross at the center of gravity of said payload; whereby the payload is substantially free-floating and moments caused by aerodynamic forces are reduced.

10. Connecting means for booster vehicle and upper stage payload, comprised of:
    a payload;
    a booster vehicle having a recess in the upper portion when it is vertically oriented for launch;
    a plurality of links pivotally secured at one end thereof to said recess bottom;
    the other end of said links pivotally secured to said payload structure;
    an extension of the longitudinal central axes of said links passing through the center of gravity of said payload;
    spring links having one end pivotally attached to said links;
    damper means on said spring links;
    the other end of said spring links pivotally secured to said booster; whereby a stable condition exists between booster and payload during positive axial thrust acceleration and moments caused by aerodynamic forces are reduced.

11. In an aircraft, the combination comprised of:
    a hollow substantially cylindrical member having a framework for support of power means at one end thereof;
    a reinforced closure element secured to said framework in spaced relationship to the other end of said cylindrical member;
    a plurality of pivot connections secured to said closure element in circumferentially spaced relationship;
    a plurality of links with a longitudinal axis and having a first end attached to said pivot connections;

each two of said links being in a common plane and forming a pair of links;
each of the pivot axes of said links and pivot connections being parallel to each of the other pivot axes;
a vehicle;
the second end of said links being pivotally attached to the rear of said vehicle in circumferentially spaced relationship;
the extended longitudinal axes of a pair of said links crossing at the center of gravity of said vehicle;
the pivot axes of the pivot connections at the second end of said links being parallel to the pivot axes at the first end of said links;
said vehicle having wings on opposite sides thereof;
the axes of said pivots being substantially parallel to a line in the plane of said wings and the lateral axis of the vehicle;
spring link means having one end pivotally attached to the said second end of said links and the other end pivotally attached to said closure member; and
said spring link means including damper means for compensating for vibrations.

12. In an aircraft for launching a vehicle, the combination of:
a substantially cylindrical booster for support of power means located at one end thereof;
a reinforced closure member secured within and in spaced relation to the other end of said cylindrical member;
a plurality of booster bars extending in spaced relation from said closure member toward said other end of said cylindrical member and having one end fixedly attached to said closure member;
pivot connections at the other end of said booster bars;
links having pivot connections at each end thereof, those on one end being adapted for mating with the pivot connections on said booster bars;
a payload having a body and a base;
wings extending from opposite sides of said payload;
said payload having a center gravity located on the centerline of the aircraft;
said wings extending substantially in the direction of the lateral axis of said payload;
a plurality of payload bars extending rearwardly in spaced relation from the base of said payload and having one end fixedly attached thereto;
pivot connections on the other end of said payload bars adapted to matingly engage the pivot connections on the other end of said links;
said payload bars symmetrically spaced a great distance apart than said booster bars;
one each of said booster and payload bars and said links forming a Z-shaped linkage securing said payload to said cylindrical booster;
the extended longitudinal axis of each link crossing the centerline of the aircraft; and
each pivot connection having an axis that is substantially parallel to the lateral axis of said payload.

13. In a rocket craft for launching a vehicle, the combination comprised of:
a substantially cylindrical member for support of power means located at one end thereof and having a central longitudinal axis;
a reinforced closure member secured within and in spaced relation to the other end of said cylindrical member;
a flange on said other end of said cylindrical member extending inwardly toward the central longitudinal axis thereof and spaced from said closure member;
said flange forming an opening;
a plurality of pivot connections on the inner portion of said flange nearest said closure member and spaced peripherally about said flange;
a plurality of links having pivot connections at each end thereof;
the pivot connection on one end of each link matingly attached to the flange pivot connections to provide pivotal movement therebetween;
a payload having a center of gravity located upon the central longitudinal axis which is coincident with an extension of said central longitudinal axis of said cylindrical member;
said payload having a body and a base;
said base being substantially perpendicular to the longitudinal axis of said payload;
an inverted substantially T-shaped extension secured to said payload base and being substantially symmetrically positioned about said longitudinal axis of said payload;
the width of the leg of said T-shaped extension being less than the dimension across said opening formed by said flange;
the crossbar of said T-shaped extension having a width greater than the opening formed by said flange and less than the interior dimension of said cylindrical member;
a plurality of pivot connections on the outer edge of said crossbar nearest said flange and spaced peripherally about said crossbar;
the pivot connections on the other end of each of said links matingly attached to a respective pivot connection on said crossbar to permit pivotal movement between said flange, said links, and said extension;
wings on said payload extending substantially parallel to the lateral axis of said payload;
each pivot connection having its axis of pivot substantially parallel to the lateral axis of said payload; and
said links being arranged in opposed pairs with the extended longitudinal axes of each pair crossing at the center of gravity of the payload when there are no aerodynamic forces acting thereon.

14. A connection for an aerodynamic body having at least two sections, comprised of:
linkage means attached to at least two of said sections;
said linkage means having a plurality of pairs of links; and
the extended longitudinal centerlines of at least two of the links in a pair crossing at the center of gravity of one section, whereby the moment caused by transverse aerodynamic forces that is applied to one section is reduced.

References Cited by the Examiner

UNITED STATES PATENTS 2,341,726 2/1944 Kolbe _____ 280—112
3,126,174 3/1964 Zetterstrom et al. _____ 60—35.6
3,195,462 7/1965 Petre _____ 102—50

FERGUS S. MIDDLETON, *Primary Examiner.*